United States Patent
Saur

Patent Number: 5,494,005
Date of Patent: Feb. 27, 1996

[54] COOLING SYSTEM FOR AN INTERNAL COMBUSTION ENGINE OF A MOTOR VEHICLE COMPRISING A VALVE

[75] Inventor: Roland Saur, Stuttgart, Germany

[73] Assignee: Behr-Thomson-Dehnstoffregler GmbH & Co., Kornwestheim, Germany

[21] Appl. No.: 301,777

[22] Filed: Sep. 7, 1994

[30] Foreign Application Priority Data

Sep. 7, 1993 [DE] Germany ............... 43 30 215.7

[51] Int. Cl.⁶ .................................................. F01P 7/14
[52] U.S. Cl. ..................................... 123/41.1; 236/34.5
[58] Field of Search .......................... 123/41.1; 236/34.5

[56] References Cited

U.S. PATENT DOCUMENTS 4,666,081  5/1987  Cook et al. ............................ 236/34.5

FOREIGN PATENT DOCUMENTS

| | | |
|---|---|---|
| 0492241A1 | 7/1992 | European Pat. Off. . |
| 3018682C2 | 11/1980 | Germany . |
| 3127645A1 | 1/1983 | Germany . |
| 3226104C2 | 1/1984 | Germany . |
| 3817952A1 | 11/1989 | Germany . |
| 9105021U1 | 8/1991 | Germany . |
| 1488653A1 | 6/1989 | U.S.S.R. . |

*Primary Examiner*—Noah P. Kamen
*Attorney, Agent, or Firm*—Evenson, McKeown, Edwards & Lenahan

[57] ABSTRACT

A cooling system for an internal combustion engine of a motor vehicle having an electrically heatable thermostatic valve that contains a coolant bypass valve. Below the opening temperature, the coolant bypass valve limits a flow cross section for the coolant quantity flowing through the coolant bypass to a minimal cross section which is enlarged when the opening temperature is exceeded. When a preselected temperature is reached during the warm-up operation, a control element switches on the heating element for a predetermined time period.

9 Claims, 2 Drawing Sheets

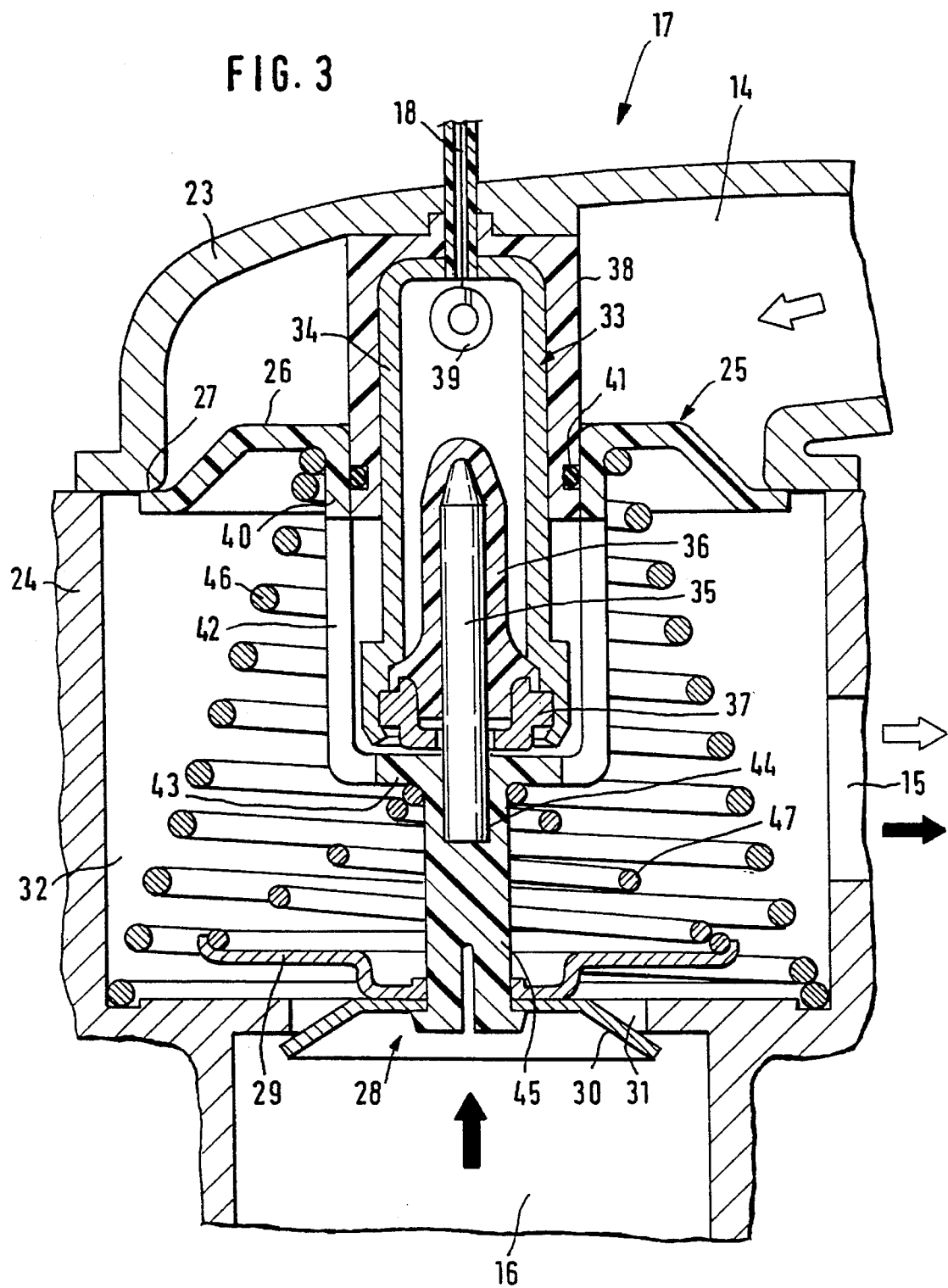

COOLING SYSTEM FOR AN INTERNAL COMBUSTION ENGINE OF A MOTOR VEHICLE COMPRISING A VALVE

The present invention relates to a cooling system for aft internal combustion engine of a motor vehicle having a valve which controls the coolant quantities, which flow through a radiator back to the internal combustion engine and/or via a coolant bypass directly back to the engine, in such a manner that at and below an opening temperature of the valve, coolant essentially flows back to the internal combustion engine only via the coolant bypass, and which is adjustable by means of a control unit analyzing operating data of the internal combustion engine and by means of a control element.

In a known cooling system of the above-described type, the valve is constructed as a thermostatic valve whose working piston is supported on an abutment which is adjustable via the control element and a control unit. By adjusting the abutment, the working range of the thermostatic valve can be changed; that is, the valve disk of the main valve and the valve disk of the coolant bypass valve may be brought into a position which does not correspond to the momentary coolant temperature which flows around the thermostatic working element of the thermostatic valve.

In another cooling system of the above mentioned type shown in European Patent Document EP 0 165 395 A2, the positions of the main valve and of the coolant bypass valve are adjusted by a control element which in turn is actuated via a control unit which is supplied with the operating data of an internal combustion engine and/or of a vehicle equipped with such an internal combustion engine and/or of the environment, and analyzes these data.

A thermostatic valve for a cooling system equipped with an electric heating element is the object of German Patent Application P 42 33 913.8 which is not a prior publication. In the case of this thermostatic valve, the housing of a thermostatic working element is arranged in a stationary manner so that the heating element can be assigned to the stationary housing directly on the inside or on the outside.

A thermostatic element equipped with an electric heating element is also known from German Patent Document DE 30 18 682 A1. In this construction, the supply of the electric energy takes place by way of the stationarily held piston of the thermostatic working element. By means of the known construction, it is endeavored to improve the control characteristics by heating the thermostatic valve.

In order for a cooling system of an internal combustion engine of a motor vehicle comprising a thermostatic working element to reach the operating temperature more rapidly, it is provided according to German Patent Application P 43 26 598.7, which is not a prior publication, that the coolant bypass valve contains a valve element which limits the flow cross section of the coolant bypass element at temperatures below the opening temperature of the thermostatic valve to a minimum cross section. After the reaching and exceeding of the opening temperature, the flow cross section of the coolant bypass is first enlarged and is then reduced again until it is completely closed when the operating temperature is reached.

It is an object of the present invention to provide a cooling system of the initially described type which allows the internal combustion engine to reach its operating temperature as fast as possible, while avoiding the risk that individual components are thermally overloaded.

For achieving this and other objects, the present invention provides that the valve contains a coolant bypass valve, which below the opening temperature limits a flow cross section for the coolant quantity flowing through the coolant bypass to a minimal cross section; after achieving and exceeding the opening temperature, enlarges this flow cross section; and closes again when the operating temperature is exceeded; and that at least one temperature sensor is assigned to the internal combustion engine which is connected to the control unit and which, when a preselected temperature is reached, triggers an opening of the valve which is limited to a predetermined time period.

The invention is based on the consideration that there is the danger that one or several components of an internal combustion engine are thermally overloaded when, because of an intense reduction of the coolant quantity flowing in the coolant bypass, there is virtually no cooling of the respective components. There is the risk that the concerned component or components exceed a critical temperature before the extremely reduced coolant bypass flow has reached the opening temperature. It is therefore provided according to the invention that the valve is opened up by a time limited actuating of the control element so that a coolant bypass flow and also a flow of coolant from the radiator is obtained to the internal combustion engine. After the heating element is switched off, the valve resumes the position corresponding to the coolant temperature and will then operate corresponding to its control characteristic. The increased coolant flow through the internal combustion engine caused by the short-term opening insures, however, that an effective cooling of the endangered components is initiated so that the danger of a thermal damage is significantly reduced. Because of the construction according to the invention, certain embodiments provide that, at the start of the warm-up phase, the coolant quantity flowing in the coolant bypass is reduced virtually to zero, so that an extremely fast warm-up of the coolant situated within the internal combustion engine will take place.

In a first embodiment of the invention, it is provided that the temperature sensor is assigned to the coolant inside the internal combustion engine and is adjusted to a temperature value below the opening temperature of the valve. The temperature value which triggers the switching-on of the heating element is expediently determined by means of tests.

In another embodiment of the invention, the temperature sensor is assigned to a component of the internal combustion engine and is adjusted to a temperature value below a temperature which is critical for this component. In this case the component temperature is monitored and analyzed directly in such a manner that thermal damage is avoided.

Other objects, advantages and novel features of the present invention will become apparent from the following detailed description of the invention when considered in conjunction with the accompanying drawings.

BRIEF DESCRIPTION OF THE DRAWINGS

FIG. 3 is a sectional view of a thermostatic valve suitable for the cooling system according to FIG. 1.

DETAILED DESCRIPTION OF THE DRAWINGS

Figure 1:
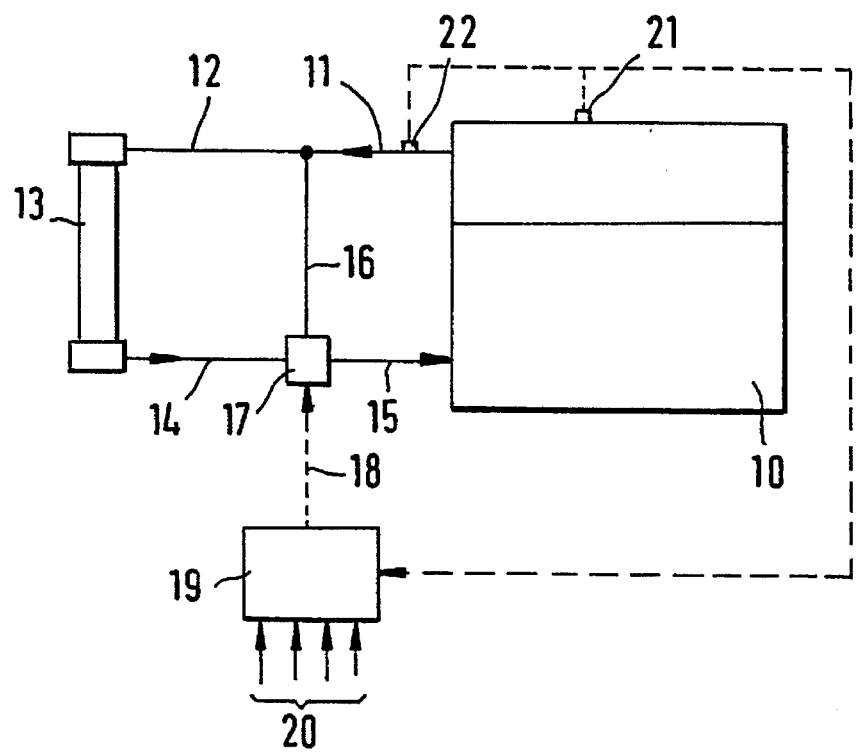
FIG. 1 is a diagrammatic view of a cooling system of an internal combustion engine constructed according to an embodiment of the present invention.

By means of its engine return flow 11, an internal combustion engine 10 is connected with the forward flow 12 of a radiator 13. The radiator return flow 14, in turn, is connected with the engine forward flow 15. A coolant bypass 16 is also provided between the engine return flow 11 and the engine forward flow 15. A valve, particularly a thermostatic valve 17 which will be explained in detail in FIG. 3, is arranged between the radiator return flow 14 and the engine forward flow 15 as well as between the coolant bypass 16 and the engine forward flow 15.

By a thermostatic working element, the thermostatic valve 17 controls the quantities of coolant which flow through the coolant bypass 16 directly to the engine forward flow 15 and from the radiator return flow 14 to the engine forward flow 15. In this case, the thermostatic valve 17 controls the above-mentioned quantities of the coolant flows in such a manner that a predetermined operating temperature of the coolant and thus of the internal combustion engine 10 will be maintained.

The thermostatic valve 17 also comprises an electric heating element assigned to the thermostatic working element. By the switching-on of the heating element, the thermostatic working element is brought to a higher temperature than the temperature which corresponds to the momentary coolant temperature in its range. By means of the heating, the quantities of flowing coolant are influenced in such a manner that the coolant quantity flowing through the coolant bypass 16 is reduced or switched off while the coolant quantity flowing directly from the radiator return flow 14 to the engine forward flow 15 is enlarged. By means of the electric heating, the coolant temperature can therefore be brought to a lower level than the level which corresponds to the operating temperature set by the thermostatic valve 17 which is not heated. The switching-on of the heating element is controlled via an electric supply line 18 by a control unit 19 which is supplied with several data indicated by arrows 20 concerning the operating condition of the internal combustion engine 10 and/or concerning the driving condition of the vehicle equipped with the internal combustion engine 10 or concerning environmental data. From the data provided to it, the control unit 19 determines whether a higher cooling output is required; that is, whether the heating element 15 of the thermostatic valve 17 is to be switched on in order to increase the cooling output.

The thermostatic valve 17 is also equipped with a special coolant bypass valve element which will also be explained in the following by means of FIG. 3. By the use of this coolant bypass valve element, the warm-up phase is shortened; that is, the time period which the internal combustion engine 10 requires after a cold start until its operating temperature is reached. For this purpose, the flow cross section for the coolant bypass flow is reduced to such an extent that only a minimal amount of coolant (in the extreme case, a zero amount) flows through the internal combustion engine 10 during the warm-up phase so that this relatively small quantity of coolant is heated very rapidly by the internal combustion engine 10. When the opening temperature of the thermostatic valve is reached and when the opening temperature is exceeded, the flow cross section for the coolant bypass flow is then first increased and is then reduced again until finally the flow cross section is completely blocked when the operating temperature is exceeded. The very rapid heating achieved by the reduction of the coolant quantity of the coolant bypass flow, however, results in the risk that individual components of the internal combustion engine 10 are not cooled during this phase and will then reach or exceed a temperature which is critical for them which may be the cause of thermal damage. In order to avoid this, an "intermediate cooling" is switched on which is illustrated by means of FIG. 2.

Figure 2:
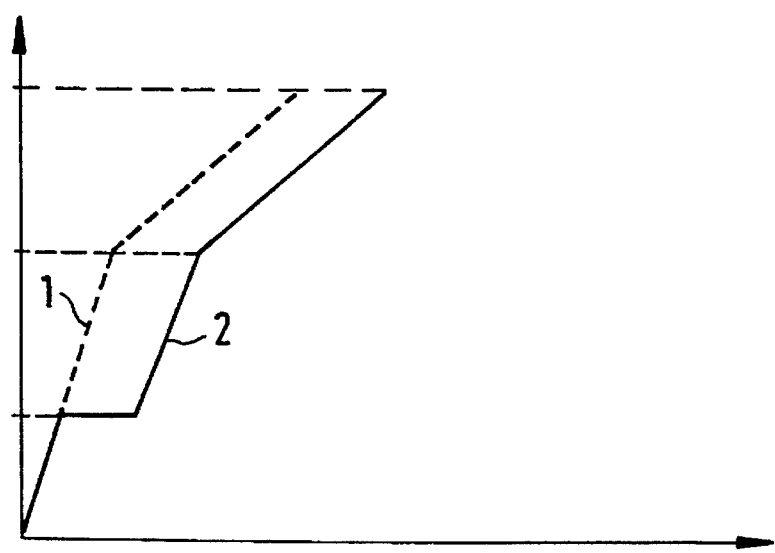
FIG. 2 is a diagram of the warm-up phase while the engine load remains the same.

In a diagram, FIG. 2 illustrates, while the engine load is the same, the rise over time of the coolant temperature at the engine outlet during the warm-up phase. Because of the reduced coolant quantity in the coolant bypass flow, a very steep rise of the temperature takes place (dashed curve 1) until the opening temperature is reached. After the reaching of the opening temperature, the coolant quantity flowing in the coolant bypass flow is increased on the one hand, while, on the other hand, coolant coming from the radiator return flow 14 is also added. As a result, after the opening temperature is reached, a significantly flatter rise of the coolant temperature and thus of the engine temperature will occur until the operating temperature is reached.

The above mentioned "intermediate cooling" takes place in order to avoid that, within the range before the reaching of the opening temperature in which there is virtually no cooling, one or several components are thermally overloaded. For this purpose the heating element of the thermostatic valve 17 is switched on for a predetermined time period so that, as a result, the thermostatic valve 17 is opened; that is, the coolant bypass flow cross section is enlarged and the main valve is also opened which permits a flow from the radiator return flow 14 to the engine forward flow 15. During this time period, an effective cooling takes place. After the switching-off of the heating element, of the thermostatic valve 17 resumes its position assigned to the coolant temperature. The coolant bypass flow cross section will then again be extensively throttled while the main valve is closed. The temperature rise therefore takes place corresponding to the course of the curve 2 up to the opening temperature and subsequently to the operating temperature.

The switching-on of the heating element of the thermostatic valve 17 and therefore the triggering of the "intermediate cooling" is controlled by the control unit 19. In a first embodiment, one or several temperature sensors 21 are assigned to the endangered component or components of the internal combustion engine 10. These temperature sensors 21 are connected to the control unit 19 and, as a function of the temperature of this component, trigger the intermediate cooling by way of the control unit 19. In this case, the temperature sensor or sensors are set to a temperature value which is below the temperature that is critical for the respective component; that is, that cannot yet lead to thermal damage.

In another embodiment, the coolant temperature of the internal combustion engine is measured by means of a temperature sensor 22 which is connected to the control unit 19. The temperature sensor 22, which is arranged at the engine return flow 11 or still within the coolant flow of the internal combustion engine 10, at a preselectable temperature, emits a signal to the control unit 19 which, as a result, then triggers the switching-on of the heating element of the thermostatic valve 17 and therefore the intermediate cooling. The temperature value to which the temperature sensor 22 is set is to be determined by tests in such a manner that, at this temperature of the coolant, the endangered components have not yet reached a critical temperature. For example, the temperature value of the temperature sensor 22 may be within the range of half the opening temperature. In another embodiment which is equivalent with respect to detecting the temperature of the coolant of the internal combustion engine 10, the control unit detects the time period from the start of the internal combustion engine and, after a predetermined time period which may be assigned to a coolant temperature, causes the short term switching on of the heating element of the thermostatic valve 17.

The thermostatic valve 17 illustrated in FIG. 3 has a valve housing comprising two parts 23, 24. Part 23 is constructed as a connecting piece for the radiator return flow pipe 14. Part 24 contains a connection for the engine forward flow 15 and the coolant bypass 16. A main valve 25 is arranged between the radiator return flow 14 and the engine forward flow 15. The main valve 25 comprises a valve disk 26 to which a valve seat 27 is assigned. Between the coolant bypass 16 and the engine forward flow 15, a coolant bypass valve 28 is arranged which comprises a coolant bypass valve disk 29 and an additional valve element 30 which are assigned to a coolant bypass valve opening 31. A mixing chamber 32 which is adjoined by the engine forward flow 15 is situated between the main valve 25 and the coolant bypass valve 28.

The positions of the main valve 25 and of the coolant bypass valve 28 are set by a thermostatic working element 33 which responds to the coolant temperature in the mixing chamber 32. The thermostatic working element 33 has a metallic housing 34 which is used as a sensing part and projects into the mixing chamber 32. The housing 34 contains an expansion material which changes its volume as a function of the temperature. A working piston 35, which is surrounded by a bag-type membrane 36, projects into the housing 34. The bag-type membrane 36 is held by a guide part 37 fastened to the open end of the housing 34 by flanging and is used for guiding the working piston 35. The housing 34 of the working element 33 is held on part 23 of the valve housing in a stationary manner by a holder 38 which is preferably made of plastic. Inside the housing 34 within the expansion material, an electric heating element 39 is arranged which can be supplied from the outside with electric energy by way of an electric supply line By means of a collar 40, the valve disk 26 of the main valve 25 is sealingly guided on the holder 38 in which additionally a sealing ring 41 is inserted. Webs 42, which extend in the axial direction of the housing 34, adjoin the closed collar 40 and transition into a bottom 43. The bottom 43 is provided with a recess 44 into which the working piston 35 is inserted. As an axial extension of the working piston 35, the bottom 43 is provided with a pin 45 on which the coolant bypass valve disk 29 and the valve element 30 are guided. The valve disk 26 of the main valve 25 is loaded by a closing spring 46 which is supported on part 24 of the valve housing and which presses the valve disk 26 in the direction of its valve seat 27. The coolant bypass valve disk 29 is loaded by a coolant bypass valve spring 47 which is supported on the coolant bypass valve disk 29 and the bottom 43 of the valve disk 26 of the main valve 25.

The thermostatic valve is shown in its cold starting position in FIG. 3. In this starting position, the main valve 25 is closed and therefore blocks the connection between the radiator return flow 14 and the engine forward flow 15. The coolant bypass valve 28 is open; that is, the short circuit valve disk 29 is lifted off the coolant bypass opening 31. In this position, the valve element 30 limits the free flow cross section for the flow from the coolant bypass 16 to the engine forward flow 15. Since the flow cross section for the coolant bypass flow is limited to a minimum, a fast heating takes place of the coolant present in the internal combustion engine 10. This coolant heats the housing 34 of the thermostatic working element projecting into the mixing chamber 32 which is therefore subjected to the temperature of the coolant. As soon as the expansion material contained in the housing 34 has reached its opening temperature, the working piston 35 is moved out of the housing 34 so that the opening of the main valve 25 will start. At the same time, the valve element 30 is moved away from the coolant bypass opening 31 so that the flow cross section for the coolant bypass flow is enlarged. The opening temperature is adjustable to a predetermined value, for example, to 70°, by the selection of the expansion material, that is, the selection of a mixture of wax. At this temperature, the wax mixture changes its aggregate condition and expands when the temperature increases, in which case the working piston 35 is driven out by means of an essentially linear movement. When the operating temperature is reached, coolant flows via the coolant bypass opening as well as through the main valve into the mixing chamber 32. The thermostatic working element 33 controls in this case the operating temperature which is also determined by the wax mixture. When the operating temperature is exceeded, the working piston 35 moves out so far that the coolant bypass valve disk 29 closes the coolant bypass opening 31 so that then only cool coolant flows from the radiator return flow 14 to the engine forward flow 15.

By the switching-on of the heating element 39, the temperature of the expansion material is heated beyond the coolant temperature existing in the mixing chamber 32 so that the working piston 35 moves out farther and in the process closes the coolant bypass opening 31 by means of the short circuit valve disk 29 and opens the main valve 25 farther. As described by means of FIG. 1, the control unit 19 determines the switching-on of the heating element corresponding to the data supplied to it and processed by it, in order to adapt the cooling requirement to the driving condition of a vehicle or to the condition of the internal combustion engine 10. In addition, the control unit 19 also switches on the heating element 39 during the warm-up phase in order to obtain the intermediate cooling described by means of FIG. 2.

Attention is drawn to the fact that the design of the valve element 30 corresponding to FIG. 3 is to be understood only as an exemplary embodiment. Within the scope of the invention, other valve designs are also possible, particularly designs which are described in German Patent Application P 43 26 598.7. Furthermore, it is also possible to provide the basic valve construction corresponding to this application; that is, to arrange the working piston of the thermostatic working element in a stationary manner and to mount the main valve disk as well as the coolant bypass valve disk and the valve element on the housing of the thermostatic working element. In this case the supply of heating energy takes place by way of the stationary working piston.

In the preceding description, the invention was explained by means of a thermostatic valve 17 which is provided with an electric heating element 39. In addition, the invention can in a similar manner also be used in a cooling system corresponding to German Patent Document DE 32 26 104 A1 or European Patent Document EP 0 165 395 A2. In principle, the invention can always be used when the valve controlling the coolant quantity, by means of outside energy, for example, or a vacuum, can be brought into positions which deviate from the position corresponding to the temperatures of the coolant.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A cooling system for an internal combustion engine of a motor vehicle comprising:

a radiator coupled to the internal combustion engine;

a coolant bypass coupled to the internal combustion engine;

a valve coupled between the radiator and the internal combustion engine and between the coolant bypass and the internal combustion engine, said valve comprising a main valve which controls quantities of coolant which flow through the radiator to the internal combustion engine; a coolant bypass valve which controls quantities of coolant which flow through the coolant bypass directly back to the engine, such that, at temperatures below an opening temperature of the valve, coolant essentially flows back to the internal combustion engine only via the coolant bypass; and a working element which controls the main valve and the coolant bypass valve;

a control unit coupled to the valve and which analyzes operating data of the internal combustion engine and adjusts the valve via a control element;

wherein the coolant bypass valve comprises a valve element which, below the opening temperature, limits a flow cross section for the coolant quantity flowing through the coolant bypass to a minimal cross section, and after the opening temperature is reached and exceeded, enlarges this flow cross section, and a valve disk which, when an operating temperature is exceeded, closes the coolant bypass valve;

and further comprising at least one temperature sensor assigned to the internal combustion engine and connected to the control unit and which, when a preselected temperature is reached, triggers an opening of the valve limited to a predetermined time period.

2. A cooling system according to claim 1, wherein the valve is a thermostatic valve whose working range is changeable by the control element.

3. A cooling system according to claim 2, wherein the control element is an electric heating element assigned to the thermostatic valve.

4. A cooling system according to claim 3, wherein the temperature sensor senses the temperature of the coolant within the internal combustion engine and is preset to a temperature value below the opening temperature of the thermostatic valve.

5. The cooling system according to claim 3, wherein the temperature sensor senses the temperature of a component of the internal combustion engine and is preset to a temperature value below a temperature which is critical for said component.

6. A cooling system according to claim 2, wherein the temperature sensor senses the temperature of the coolant within the internal combustion engine and is preset to a temperature value below the opening temperature of the thermostatic valve.

7. The cooling system according to claim 2, wherein the temperature sensor senses the temperature of a component of the internal combustion engine and is preset to a temperature value below a temperature which is critical for said component.

8. A cooling system according to claim 1, wherein the temperature sensor senses the temperature of the coolant within the internal combustion engine and is preset to a temperature value below the opening temperature of the valve.

9. The cooling system according to claim 1, wherein the temperature sensor senses the temperature of a component of the internal combustion engine and is preset to a temperature value below a temperature which is critical for said component.

\* \* \* \* \*